United States Patent

Yonekubo

[11] 4,353,624
[45] Oct. 12, 1982

[54] AFOCAL RELAY LENS SYSTEM

[75] Inventor: Ken Yonekubo, Hachiouji, Japan

[73] Assignee: Olympus Optical Co., Ltd., Tokyo, Japan

[21] Appl. No.: 133,651

[22] Filed: Mar. 21, 1980

[30] Foreign Application Priority Data

Mar. 30, 1979 [JP] Japan .................................. 54-37973

[51] Int. Cl.³ .......................... G02B 9/58; G02B 13/00
[52] U.S. Cl. ..................................... 350/453; 350/54
[58] Field of Search .......................... 350/54, 453, 415

[56] References Cited

U.S. PATENT DOCUMENTS

| | | | |
|---|---|---|---|
| 2,949,816 | 8/1960 | Weaver | 350/54 |
| 3,466,111 | 9/1969 | Ring | 350/54 |
| 3,472,578 | 10/1969 | Price | 350/453 |
| 3,532,416 | 10/1970 | Schmidt | 350/453 |
| 4,047,794 | 9/1977 | Park | 350/54 |

Primary Examiner—John K. Corbin
Assistant Examiner—Rebecca D. Gass
Attorney, Agent, or Firm—Cushman, Darby & Cushman

[57] ABSTRACT

A relay lens system designed as an afocal lens system having a magnification level of 1x and comprising a first lens group having negative refractive power, a second lens group having positive refractive power and a third lens group having negative refractive power, said relay lens system being arranged between an objective lens and an eyepiece, and used for relaying an image of an object formed by said objective lens.

3 Claims, 9 Drawing Figures

AFOCAL RELAY LENS SYSTEM

BACKGROUND OF THE INVENTION

1. Field of the Invention

The present invention relates to an afocal relay lens system for use with microscoper.

2. Description of the Prior Art

A microscope generally has such a construction as shown in FIG. 1 and is equipped on the side of the microscopist with an objective lens O which is not used for microscopy and which is a hindrance for observation. In order to correct this defect, it is necessary to construct the microscope as shown in FIG. 2. In order to design a microscope having such a construction as shown in FIG. 2, it is necessary to arrange a relay lens system between the objective lens and an eyepiece so that an image of an object formed by the objective lens is formed again at a predetermined position. Further, in a microscope system equipped with various accessories, a relay lens system is also required for changing the imaging position of the objective lens when the accessories are to be used for microscopy. There has conventionally been known a relay lens system comprising a concave lens group and a convex lens group for shifting the image position of the objective lens in microscopes as described above. When the imaging point of the microscope without using the relay lens system is represented by $O_1$, the imaging point of the microscope using the relay lens system is designated by $O_2'$ and the image of $O_1$ formed by the concave lens group $L_1$ is denoted by $O_1'$ in a relay lens system consisting of the two concave and convex lens groups $L_1$ and $L_2$ as shown in FIG. 3, the image is shifted rearward for a distance of $\epsilon$. When $\overrightarrow{A_1 O_1}$ is represented by $\alpha$, $\overrightarrow{A_1 O_1}$, is designated by $\alpha'$, $\overrightarrow{A_1 A_2}$ is denoted by d, and focal lengths of the lens groups $L_1$ and $L_2$ are represented by $f_1$ and $f_2$ respectively in this figure, the following relations (1), (2) and (3) established by the imaging formula:

$$-\frac{1}{\alpha} + \frac{1}{\alpha'} = \frac{1}{f_1} \quad (1)$$

$$-\frac{1}{\alpha' - d} + \frac{1}{\alpha + \epsilon - d} = \frac{1}{f_2} \quad (2)$$

$$\beta = \frac{\alpha'}{\alpha} \times \frac{\alpha + \epsilon - d}{\alpha' - d} \quad (3)$$

From these formulae (1) (2) and (3), $f_1$ and $f_2$ can be determined as follows:

$$f_1 = \frac{\beta \cdot \alpha \cdot d}{-\epsilon + d(1 - \beta) + \alpha(\beta - 1)} \quad (4)$$

$$f_2 = \frac{d(\alpha + \beta - d)}{\epsilon + \alpha(1 - \beta)} \quad (5)$$

Since the actual visual field of such a relay lens system is narrowed if it is of a magnifying type, or the image magnified by the objective lens is reduced if it is of a reducing type, both the types are undesirable. Further, a relay lens system designed for an fractional magnification level is undesirable since it results in an fractional magnification level of the entire microscope. Therefore, a relay lens system should preferably have a magnification level of 1x. When $\beta$ is set at 1 in the formulae (4) and (5) above, $f_1$ and $f_2$ are calculated by the following formulae (4') and (5') respectively:

$$f_1 = \frac{-\alpha d}{\epsilon} \quad (4')$$

$$f_2 = \frac{d(\alpha + \epsilon - d)}{\epsilon} \quad (5')$$

FIG. 4 illustrates shift of position Q of the exit pupil of the objective by a relay lens system consisting of the concave lens group $L_1$ and convex lens group $L_2$. In this figure, the reference symbol Q' represents an image of the entrance pupil Q formed by the lens group $L_1$, the reference symbol Q'' designates an image of Q' formed by the lens group $L_2$, and the reference symbols $Z_1$, $Z_1'$, $Z_2$ and $Z_2'$ denote positions of Q, Q' and Q'' as illustrated.

Examples of numerical data for relay lens systems consisting of such concave lens group $L_1$ and convex lens group $L_2$ will be described below:

(Example 1)

In case of $\epsilon=20$, $d=10$, $\beta=1x$ and $\alpha=140$:
From the formula (4'), $f_1 = -140 \times 10/20 = -70$
From the formula (5'), $f_2 = 10 \times (140+20-10)/20 = 75$
In addition, when position $Z_1$ of the entrance pupil is set at $-35$, positions $Z_1'$ and $Z_2'$ of Q' and Q'' are calculated as follows:
From $-1/Z_1 + 1/Z_1' = 1/f$, $1/35 + 1/Z_1' = -1/70$
Hence, $1/Z_1' = -3/70$ and $$Z_2 = d_1 - Z_1' = 10 + \frac{70}{3} \approx 33$$

From $-1/Z_2 + 1/Z_2' = 1/f_2$, $-1/33 + 1/Z_2' = 1/75$
Therefore we obtain:
$Z_2' \div -59$ and
OTL (optical tube length)$=(\alpha+\epsilon-d)-Z_2'=209$
Magnification level $\beta_Q$ of the pupil is:

$$\beta_Q = \frac{Z_1'}{Z_1} \times \frac{Z_2'}{Z_2} = \frac{23}{35} \times \frac{59}{33} = 1.17$$

(EXAMPLE 2)

In case of $\epsilon=20$, $d=20$, $\beta=1x$ and $\alpha=140$:
$f_1 = -140$
$f_2 = 140$
Numerical data for pupil:
$Z_1' = -28$, $Z_2 = 48$, $Z_2' = -73$
OTL$=213$
$\beta_Q = 1.23$ (Example 3)

In case of $\epsilon=40$, $d=20$, $\beta=1x$ and $\alpha=140$:
$f_1 = -70$
$f_2 = 90$
Numerical data for pupil:
$Z_1' = -23$, $Z_2 = 43$, $Z_2' = -82.3$
OTL$=242.3$, $\beta_Q = 1.26$ In all the examples described above, all the magnification levels $\beta_Q$ of the pupil are larger than 1, clarifying that the pupil is magnified by the relay lens system and that position of the pupil is made farther from the eyepiece side. The pencil therefore has a larger diameter to constitute a cause for eclipse and flare. In order to prevent the eclipse, it is obliged to design the optical system on the rear side of the relay lens system so as to have a larger diameter.

Further, it will be understood, by comparing the Example 1, 2 and 3 with one another, that a larger value of ε or d will increase the value of $\beta_Q$. (Magnification level of the pupil in the Example 2 is higher than that in the Example 1, and that in the Example 3 is higher than that in the Example 2). That is to say, the pupil is enlarged as ε and d have larger values respectively. Furthermore, the distance as measured from the image formed by the relay system to the image of the exit pupil of the objective formed by said relay lens system is prolonged as ε and d have larger values.

In order to prevent the pupil from being located at such a position, a relay lens system should desirably be of an afocal type. An afocal type of relay lens system can provide an effect which is equivalent to optical tube length remaining fixed. In other words, an afocal type of relay lens system gives no influence at all on the optical system arranged on the rear side of the relay lens system, with magnification level excepted from consideration.

In view of the foregoing, a relay lens system should preferably be of an afocal type having a magnification level of $\beta=1$. As is understood from FIG. 5, however, it is impossible to obtain an afocal type of relay lens system consisting of two concave and convex lens groups and designed for a magnification level of 1x. Conversely, an afocal type of relay lens system cannot be designed when magnification level is selected at $\beta=1$.

It is therefore impossible to obtain a desirable relay lens system which is designed as an lens system consisting of a concave lens group and a convex lens group.

SUMMARY OF THE INVENTION

A primary object of the present invention is to provide a relay lens system used for relaying an image of an object formed by an objective lens and designed as an afocal lens system having a magnification level of 1x and comprising a first lens group, a second lens group and a third lens group.

Another object of the present invention is to provide a relay lens system designed as an afocal lens system having a magnification level of 1x and comprising a first lens group having negative refractive power, a second lens group having positive refractive power and a third lens group having negative refractive power.

A further object of the present invention is to provide a relay lens system comprising a first lens group, a second lens group and a third lens group and so designed as to satisfy the following conditions:

$$f_1 = s_0\left(\frac{\epsilon}{d} - 1\right)$$

$$f_2 = \frac{s_0 f_3}{f_1 + f_3}$$

$$f_3 = s_0\left(\frac{\epsilon - d}{d}\right)\left(\frac{d^2}{s_0 \epsilon} - 1\right)$$

$$25 < s_0 < 55$$

wherein the reference symbols $f_1$, $f_2$ and $f_3$ represent focal lengths of said lens groups respectively, the reference symbols $s_0$ designates the distance in millimeters as measured from the rear focal point of said first lens group to said second lens group, the reference symbol ε denotes displacement of image carried out by said relay lens system and the reference symbol d represents the distance between said first lens group to said third lens group.

DETAILED DESCRIPTION OF THE PREFERRED EMBODIMENT

Figure 1:
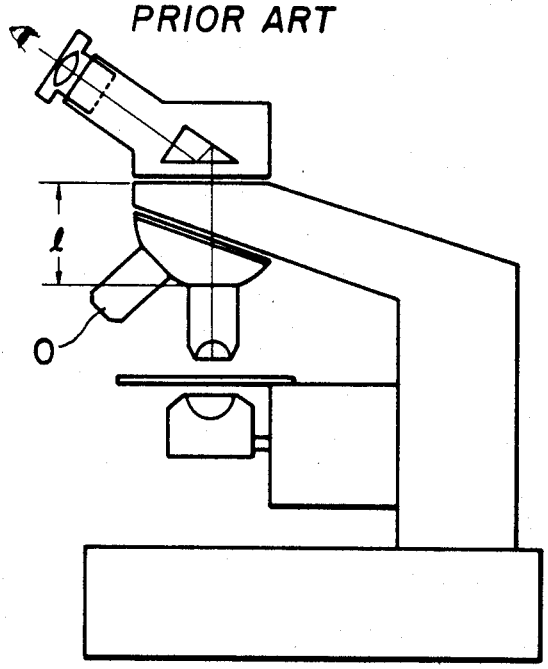
FIG. 1 shows a schematic representation illustrating construction of the miscroscope which has conventionally been used.
Figure 2:
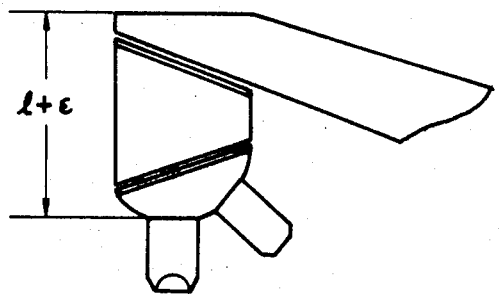
FIG. 2 shows a schematic representation illustrating an application mode of a relay lens system.
Figure 3:
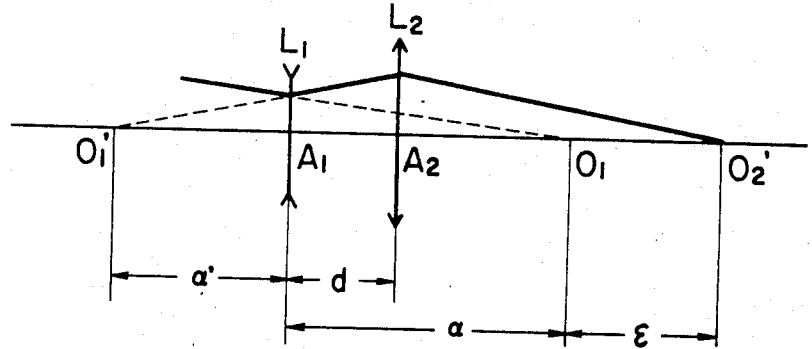
FIG. 3 shows a diagram illustrating positional relationship in the optical system of the conventional relay lens system.
Figure 4:
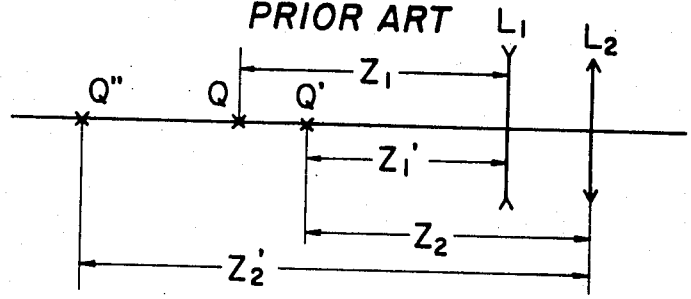
FIG. 4 shows a diagram illustrating position of the pupil in the conventional relay lens system.
Figure 5:
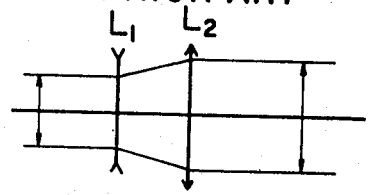
FIG. 5 shows a diagram illustrating an afocal lens system consisting of a concave lens group and a convex lens group.
Figure 6:
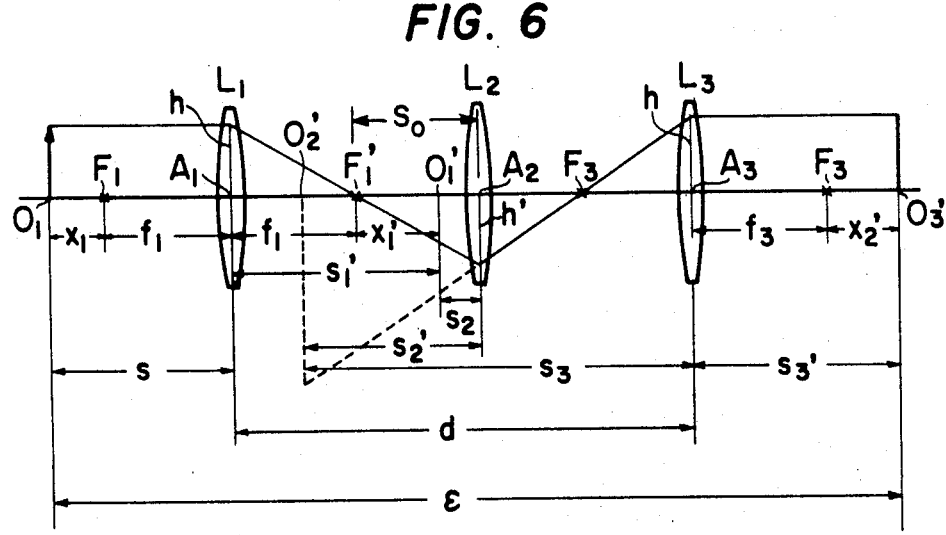
FIG. 6 shows a sectional view illustrating composition of the optical system in the relay lens system according to the present invention.

In relay lens system consisting of a first lens group $L_1$, a second lens group $L_2$ and a third lens group $L_3$ as shown in FIG. 6, there is established the following relations (6) through (12):

$$\frac{h}{f_1} = -\frac{h'}{s_0}, \; -\frac{h'}{s'_0} = \frac{h}{f_3} \; [\because s'_0 f_1 = s_0 f_3] \quad (6)$$

$$(7) \; f_1 + s_0 + s'_0 + f_3 = d$$

$$f_2 = \frac{s_0 s'_0}{s_0 + s'_0} \quad (8)$$

$$(9) \; \epsilon = x_1 + 2f_1 + s'_0 + 2f_3 + x'_2$$

$$x'_1 = \frac{f_1^2}{x_1} \quad (10)$$

$$\frac{1}{s_0 - x'_1} + \frac{1}{s'_2} = \frac{1}{f_2} \left[\therefore s'_2 = \frac{f_2(s_0 - x'_1)}{s_0 - x'_1 - f_2}\right] \quad (11)$$

$$x' = \frac{f_3^2}{s'_0 - s'_2} \quad (12)$$

wherein the reference symbol $x_1$ represents distance $\overrightarrow{O_1F_1}$, the reference symbol $x_1'$ designates distance $\overrightarrow{F_1'O_1'}$, the reference symbol $s_2'$ denotes distance $\overrightarrow{O_2'A_2}$, the reference symbol $s_0$ represents distance $\overline{F_1'A_2}$, the reference symbol $s_0'$ designates distance $\overline{A_2F_3}$, and the reference symbols $f_1$, $f_2$ and $f_3$ denote focal lengths of the lens groups $L_1$, $L_2$ and $L_3$ respectively.

Among the relations mentioned above, the formula (6) is a condition established based on the fact that the relay lens system is of an afocal type designed for a magnification level of 1x, and the formulae (7) through (12) are determined by applying the formulae for lens systems. From these formulae (6) through (12), focal lengths $f_1$, $f_2$ and $f_3$ of the respective lens groups are calculated as follows:

$$f_1 = s_0\left(\frac{\epsilon}{d} - 1\right) \quad (13)$$

$$f_2 = \frac{s_0 f_3}{f_1 + f_3} \quad (14)$$

$$f_3 = s_0\left(\frac{\epsilon - d}{d}\right)\left(\frac{d^2}{s_0 \cdot \epsilon} - 1\right) \quad (15)$$

Signs and values of the respective focal lengths $f_1$, $f_2$ and $f_3$ are dependents on selection of $\epsilon$, d and $s_0$. However, it is necessary to design so as not to make $\epsilon$ nearly equal to d since $f_1$ and $f_2$ will have very small values when $\epsilon$ is nearly equal to d. Since $\epsilon$ has actually a given value, the value of d is substantially determined. Therefore, focal length of each lens group is substantially dependent on value of $s_0$. From a viewpoint of correcting aberrations, it is preferable to select a values of $s_0$ within a range defined by the following condition:

$25 < s_0 < 55$

That is to say, when $s_0$ has a value smaller than 25, $|f_1|$ and $|f_2|$ will have two small values, thereby making it difficult to correct aberrations by the lens groups $L_1$ and $L_2$. If $s_0$ is larger than 55, in contrast, $|f_3|$ will have a very small value, thereby making it difficult to correct aberrations by the lens group $L_3$.

Figure 7:
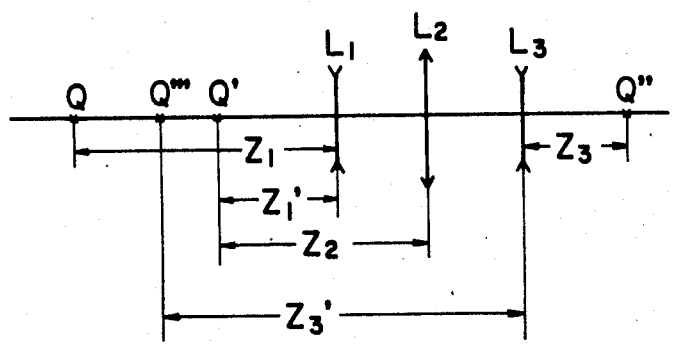
FIG. 7 shows a diagram illustrating position of the pupil in the relay lens system according to the present invention.

The pupil Q is located at the position shown in FIG. 7. In this figure, Q' represents an image of Q, Q'' designates an image of Q' and Q''' denotes an image of Q''. Therefore the pupil Q is shifted to Q''' by the relay lens system.

Now, an example of numerical data for a relay lens system designed as an afocal lens system having a magnification level of 1x will be described below:

In case where $\epsilon$ is selected at 20 and d is set at 40, the formula (13) gives $f_1 = -\frac{1}{2}s_0$, and the formula (15) gives $f_3 = -\frac{1}{2}s_0$ $$\left(\frac{80}{s_0} - 1\right)$$

When $s_0$ is set at 20, 30, 40, 50 and 60, $f_1$, $f_2$ and $f_3$ have the values listed below:

|        | $s_0 = 20$ | $s_0 = 30$ | $s_0 = 40$ | $s_0 = 50$ | $s_0 = 60$ |
|--------|------------|------------|------------|------------|------------|
| $f_1$  | −10        | −15        | −20        | −25        | −30        |
| $f_2$  | 15         | 18.75      | 20         | 18.75      | 15         |
| $f_3$  | −30        | −25        | −20        | −15        | −10        |

Among the numerical data listed in the above table, let us take $s_0 = 40$ as an example. That is to say, in a case of $\epsilon = 20$, $d = 40$, $s_0 = 40$, $s_1 = 140$ and $Z_1 = -35$, position of image and position of the pupil are calculated as follows:

Position of image:

$$-\frac{1}{140} + \frac{1}{s'_1} = \frac{1}{f_1} = -\frac{1}{20}, s'_1 = -23.33 \quad (L_1)$$

$$s_2 = 20 - s'_1 = 43.33$$

$$\frac{1}{43.33} + \frac{1}{s'_2} = \frac{1}{f_2} = \frac{1}{20}, s'_2 = 37.15 \quad (L_2)$$

$$s_3 = s'_2 - 20 = 17.15$$

$$-\frac{1}{17.15} + \frac{1}{s'_3} = \frac{1}{f_3} = -\frac{1}{20}, s_3 = 120.4 \quad (L_3)$$

Position of the pupil:

$$\frac{1}{35} + \frac{1}{z'_1} = -\frac{1}{20}, z'_1 = -12.7, z_2 = 20 - z'_1 = 32.7 \quad (L_1)$$

$$\frac{1}{32.7} + \frac{1}{z'_2} = \frac{1}{20}, z'_2 = 51.4, z_3 = z'_2 - 20 = 31.4 \quad (L_2)$$

$$-\frac{1}{31.4} + \frac{1}{z'_3} = -\frac{1}{20}, z'_3 = -55 \quad (L_3)$$

$$OTL = 175$$

$$\beta_Q \approx 1$$

As is understood from the foregoing descriptions and calculation example, it is possible to design a relay lens system having a magnification level of 1x as an afocal lens system consisting of three lens groups. This lens system is preferable as a relay lens system since the distance as measured from the image of an object formed by the relay lens system to the image of the pupil of the objective lens formed by the relay lens system is equivalent to the distance from the image of the object formed by the objective lens to the pupil of the objective lens.

Figure 8:
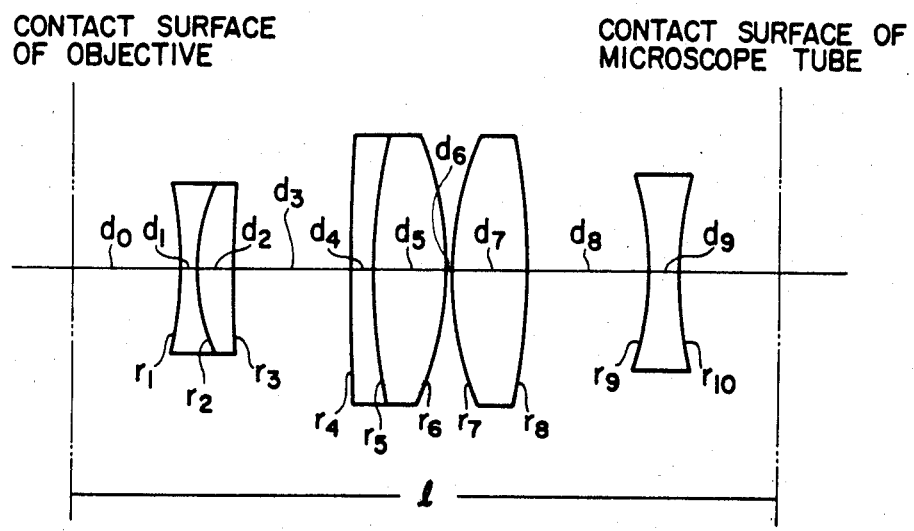
FIG. 8 shows a sectional view illustrating composition of a relay lens system preferred as an embodiment of the present invention.

FIG. 8 shows composition of a relay lens system preferred as an embodiment of the present invention comprising a first lens group $L_1$ consisting of a negative cemented doublet component, a second lens group $L_2$ consisting of a positive cemented doublet component and a positive lens component, and a third lens groups $L_3$ consisting of a negative lens component. The relay lens system has the following numerical data:

| | | | |
|---|---|---|---|
| $r_1 =$ −31.329 | | | |
| | $d_1 = 1.5$ | $n_1 = 1.6425$ | $\nu_1 = 58.37$ |
| $r_2 =$ 16.617 | | | |
| | $d_2 = 3.0$ | $n_2 = 1.497$ | $\nu_2 = 81.60$ |
| $r_3 =$ 240.41 | | | |
| | $d_3 = 10.0$ | | |
| $r_4 =$ 695.54 | | | |
| | $d_4 = 2.0$ | $n_3 = 1.56138$ | $\nu_3 = 45.18$ |
| $r_5 =$ 48.835 | | | |
| | $d_5 = 6.0$ | $n_4 = 1.48749$ | $\nu_4 = 70.15$ |
| $r_6 =$ −27.401 | | | |
| | $d_6 = 0.5$ | | |
| $r_7 =$ 25.499 | | | |
| | $d_7 = 6.5$ | $n_5 = 1.5119$ | $\nu_5 = 58.14$ |
| $r_8 =$ −53.219 | | | |
| | $d_8 = 10.5$ | | |
| $r_9 =$ −24.213 | | | |
| | $d_9 = 2.5$ | $n_6 = 1.56013$ | $\nu_6 = 46.99$ |
| $r_{10} =$ 33.222 | | | |
| | $d_0 = 9$, | $l = 60$, | $\epsilon = 20$ |
| Magnification of image 0.998 X, | | Magnification of pupil 1.001 X | |
| $f_1 = -31.6$, | | $f_2 = 22.2$, | $f_3 = -24.6$ |

Figure 9:
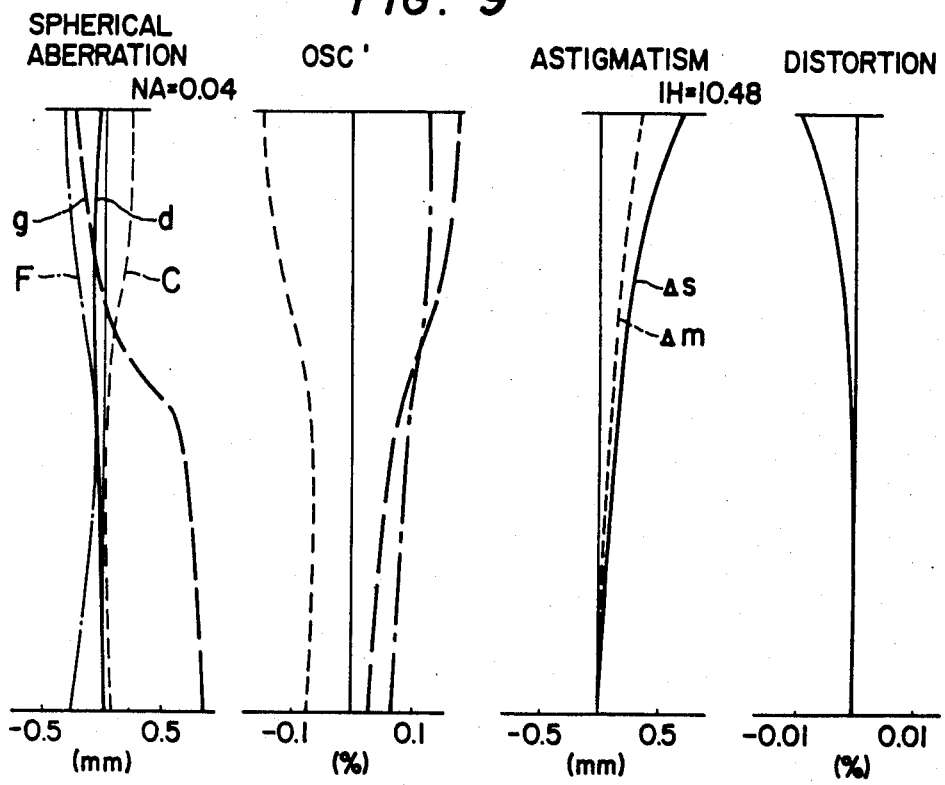
FIG. 9 shows curves illustrating the aberration characteristics of the embodiment of the present invention.

Curves illustrating the aberration characteristics of the above-mentioned embodiment are illustrated in FIG. 9.

As an ideal relay lens system, an afocal lens system designed for a magnification level of 1x has been described above. However, it is possible to design a relay lens system for $\beta=1$ and $\beta_O \neq 1$ by deviating magnification level of the pupil within such a range as to constitute no hindrance to use of optical system arranged on the rear side of the relay lens system. Such a means will facilitate lens design by increasing flexibility for lens design and especially be advantageous for correcting aberrations in relay lens systems.

I claim:

1. In a relay lens system arranged between an objective lens and an eyepiece and used for relaying an image of an object formed by said objective lens, a relay lens system is designed as an afocal lens system having a magnification level of 1X and comprises a first lens group, a second lens group and a third lens group, wherein said first lens group is a negative lens group, said second lens group is a positive lens group and said third lens group is a negative lens group, and wherein said relay lens system is located between the objective and the image position of the objective.

2. A relay lens system according to claim 1 satisfying the following relations:

$$f_1 = s_0\left(\frac{\epsilon}{d} - 1\right)$$

$$f_2 = \frac{s_0/3}{f_1 + f_3}$$

$$f_3 = s_0\left(\frac{\epsilon - d}{d}\right)\left(\frac{d^2}{s_0\epsilon} - 1\right)$$

$$25 < s_0 < 55$$

wherein the reference symbols $f_1$, $f_2$ and $f_3$ represent focal lengths of said first, second and third lens groups respectively, the reference symbols $s_0$ designate the distance in millimeters as measured from the rear focal point of said first lens group to said second lens group, the reference symbol $\epsilon$ denote displacement of image caused by said relay lens system and the reference symbol d represents distance between said first lens group and said third lens group.

3. A relay lens system according to claim 2 wherein said first lens group consists of a negative cemented doublet component, said second lens group consists of a positive cemented doublet component and a positive lens component, and said third lens group consists of a negative lens component, said relay lens system having the following numerical data:

| | | | |
|---|---|---|---|
| $r_1 = -31.329$ | | | |
| | $d_1 = 1.5$ | $n_1 = 1.6425$ | $\nu_1 = 58.37$ |
| $r_2 = 16.617$ | | | |
| | $d_2 = 3.0$ | $n_2 = 1.497$ | $\nu_2 = 81.60$ |
| $r_3 = 240.41$ | | | |
| | $d_3 = 10.0$ | | |
| $r_4 = 695.54$ | | | |
| | $d_4 = 2.0$ | $n_3 = 1.56138$ | $\nu_3 = 45.18$ |
| $r_5 = 48.835$ | | | |
| | $d_5 = 6.0$ | $n_4 = 1.48749$ | $\nu_4 = 70.15$ |
| $r_6 = -27.401$ | | | |
| | $d_6 = 0.5$ | | |
| $r_7 = 25.499$ | | | |
| | $d_7 = 6.5$ | $n_5 = 1.5119$ | $\nu_5 = 58.14$ |
| $r_8 = -53.219$ | | | |
| | $d_8 = 10.5$ | | |
| $r_9 = -24.213$ | | | |
| | $d_9 = 2.5$ | $n_6 = 1.56013$ | $\nu_6 = 46.99$ |
| $r_{10} = 33.222$ | | | |
| | $d_0 = 9$, | $l = 60$, | $\epsilon = 20$ |
| Magnification of image 0.998 X, | | Magnification of pupil 1.001 X | |
| $f_1 = -31.6$, | | $f_2 = 22.2$, | $f_3 = -24.6$ | wherein the reference symbols $r_1$ through $r_{10}$ represent radii of curvature on the surfaces of the respective lens elements, the reference symbols $d_1$ through $d_8$ designate thicknesses of the respective lens elements and airspaces reserved therebetween, the reference symbols $n_1$ through $n_6$ denote refractive indices of the respective lens elements, the reference symbols $\nu_1$ through $\nu_6$ represent Abbe's numbers of the respective lens elements, the reference symbol $d_0$ designates distance as measured from the contact surface of the objective lens to said first lens group and the reference symbol l denotes distance as measured from the contact surface of the objective lens to the attached surface of the relay lens system.

* * * * *